Oct. 2, 1951 J. U. BETE Re. 23,413

SPIRAL FILM SPRAY NOZZLE

Original Filed Feb. 26, 1946

Inventor
John U. Bete
by Roberts, Cushman & Grover
Att'ys.

Reissued Oct. 2, 1951 Re. 23,413

UNITED STATES PATENT OFFICE 23,413

SPIRAL FILM SPRAY NOZZLE

John U. Bete, Greenfield, Mass., assignor, by mesne assignments, to Bete Fog Nozzle, Inc., Greenfield, Mass., a corporation of Massachusetts Original No. 2,518,116, dated August 8, 1950, Serial No. 650,341, February 26, 1946. Application for reissue May 25, 1951, Serial No. 228,332

5 Claims. (Cl. 299—130)

Matter enclosed in heavy brackets [ ] appears in the original patent but forms no part of this reissue specification; matter printed in italics indicates the additions made by reissue.

This invention relates to a spray nozzle and its principal object is to provide a nozzle which is of simple but durable construction, efficient and reliable in operation and embodying a design which may readily be varied so as to obtain the desired spray characteristics.

Further objects relate to various features of construction and will be apparent from the consideration of the following description and the accompanying drawings, wherein.

In accordance with the present invention my spray nozzle comprises a generally tubular member having a body portion defined by one or more helical threads or vanes, one end of the tubular member defining an inlet and preferably being formed so as to provide a connection with a pipe line or the like. The opposite end of the tubular member is provided with a generally conical insert having its tapered portion extending inwardly in coaxial relation and preferably coextensive with the helical vane or vanes. With this construction and arrangement, variations in the type and character of the spray may be had by varying (a) the lead or pitch of the helical vane or vanes; (b) the number of vanes, i. e., single, double, etc.; (c) the length and shape of the insert; (d) the angle and shape of the active surface of the helical vane or vanes; and (e) the diameter of the helix defined by the vanes.

With a given tubular member having uniform helical vanes, the spray characteristics may be modified by varying the shape of the tapered insert, an insert having a surface contour presenting a generally parabolic shape producing the maximum degree of fineness of spray, although a straight taper, i. e., a geometric cone, produces satisfactory results and has the further advantage of being more economical to manufacture. Special spray patterns, e. g., coarse outside cone and fine inside cone, may be obtained by using inserts having different shaped surface contours. The size and shape of the entrance inlet or throat may also be varied to obtain different effects, but for general use, a high velocity jet is usually desired, and to this end a Venturi throat is recommended.

A full cone spray may be obtained by varying the lead of the helical thread or vane from one end to the other, or by varying its shape or form from one end to the other, or by forming the vanes with compound cuts, e. g., cutting the thread over its entire length with a 60° cutter, followed with a 90° cut over a portion of its length, or a combination of two or all of these modifications. Thus, an unlimited number of spray patterns and characteristics may be obtained from the same basic arrangement of parts.

Figure 1:
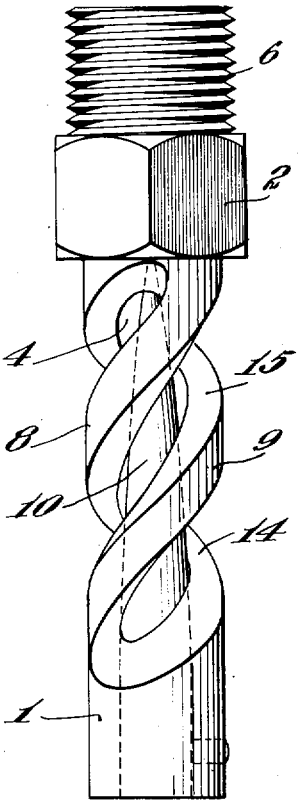
Fig. 1 is an elevation of a spray nozzle constructed in accordance with the present invention.
Figure 2:
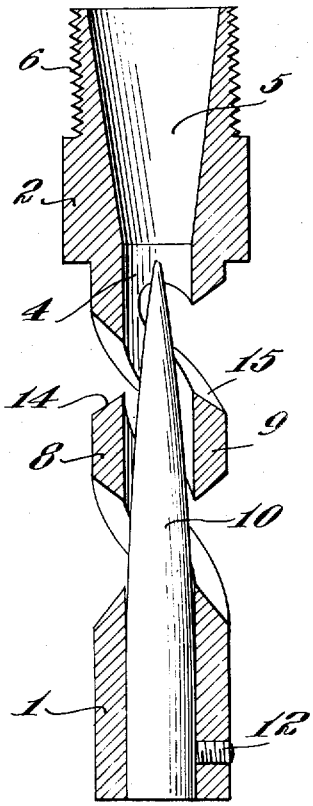
Fig. 2 is a vertical section through the nozzle shown in Fig. 1.
Figure 3:
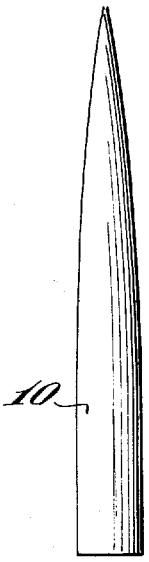
Fig. 3 is an elevation of the insert.

Referring to Figs. 1 to 3, which illustrates what is now considered a preferred embodiment particularly suitable for use as a sprinkler in a fire protection system, a length of metal rod of hexagonal cross section, turned down to form a cylindrical body portion 1 and a hexagonal coupling head 2 is bored or drilled axially to provide a central channel 4 communicating with a Venturi throat or inlet 5 formed in the head 2. The outer end of the head 2 is turned down and threaded, as shown at 6, to provide a coupling element for attachment to a pipe or other conduit, and the body portion is milled or cut away to form a pair of helical threads or vanes 8 and 9 of generally trapezoidal cross section.

A generally conical insert 10 (Fig. 3) having a surface contour of approximately parabolic curvature, is disposed within the channel 4 with its enlarged end sealing the outer end of the channel, and its tapered body portion extending coaxially into the channel with its inner end terminating at or adjacent to the inner end of the throat 5, as shown in Fig. 2. A set screw 12, carried by the lower end of the tubular body 1, holds the insert 10 securely in place.

The sprinkler head herein shown may be screwed into a socket equipped with a fusible plug or the like, and when put in use, the high velocity jet issuing from the throat 5 is progressively diverted outwardly by the insert 10 as it travels the length of the vanes 8 and 9, so that it impinges upon the *inner edges of the* upper faces 14 and 15 of the vanes and *is directed outward along said faces and* is thus transformed into a relatively fine conical shaped spray.

Figure 4:
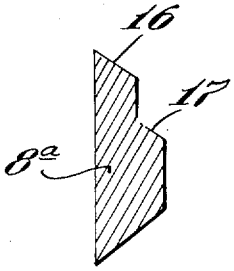
Fig. 4 is a cross section through a thread or vane of modified form.

If it be desired to increase the fineness of the spray, the upper or active surface of each vane 8[a] may be stepped, as shown in Fig. 4, to provide a relatively narrow inner surface 16 spaced above the outer surface 17. This particular design appreciably reduces the frictional resistance of the fluid passing over the active surface of the vanes without materially reducing the mechanical strength of the spray nozzle.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. A nozzle for producing a continuous spiral film, comprising a generally cylindrical member, the intermediate portion of which is cut away to form a continuous helical thread having substantially parallel inner and outer walls with adjoining faces that are outwardly convergent, the inner wall of said thread being of greater width than the outer wall and defining an axial bore of substantially uniform diameter, one end of said cylindrical member providing a fluid inlet, and a generally conical insert in the other end of said cylindrical member with its tapered end portion extending toward said inlet and coaxially within said helical thread.

2. A nozzle for producing a continuous spiral film, comprising a generally cylindrical member, the intermediate portion of which is cut away to form a continuous helical thread of approximately trapezoidal-shaped cross-section, the inner wall of said thread being of greater width than the outer wall and defining an axial bore of substantially uniform diameter, one end of said cylindrical member providing a fluid inlet having an interior wall formed with a Venturi throat, and a parabolical-shaped insert in the other end of said cylindrical member with its tapered end portion extending toward said inlet and coaxially within said helical thread.

3. A nozzle for producing a continuous spiral film, comprising a generally cylindrical member, the intermediate portion of which is cut away to form a continuous helical thread having substantially parallel inner and outer walls with adjoining faces that are outwardly convergent, the inner wall of said thread being of greater width than the outer wall and defining an axial bore of substantially uniform diameter, one end of said cylindrical member providing a fluid inlet, the adjoining face of said thread opposing the fluid flow through said bore being stepped to provide a relatively narrow surface spaced inwardly of and axially offset from the outer surface portion thereof, and a generally conical insert in the other end of said cylindrical member with its tapered end portion extending toward said inlet and coaxially within said helical thread.

*4. A nozzle for producing a spray directed upward around an axis comprising a generally tubular member having a throat portion receiving a liquid supply and forming it into a jet around said axis, a generally conical core member coaxial with said tubular member and positioned centrally in said jet and having a surface of revolution enlarging in the direction of flow of the jet along smoothly continuous lines curving from a direction partly radial at the apex toward a more nearly axial direction to divert the jet flow progressively outward in annular formation around said core member, and a vane winding helically around said core member and said annular jet and having an active surface inclined upward at an angle to said axis and also winding around said core member in helical formation and having a free inner edge at substantially constant distance from the said axis so as to be spaced progressively nearer to the surface of said core member, the jet issuing from said throat being progressively spread outward in said annular formation by said core member along the length of said vane to impinge on the said inner edge of the active surface thereof to be transformed into a relatively fine spray.*

*5. A nozzle for producing a spray directed outward around an axis comprising a generally tubular member having a throat portion receiving a liquid supply and forming it into a jet around said axis, a core member coaxial with said tubular member and positioned centrally in said jet and enlarging in the direction of flow of the jet to divert the jet flow progressively outward in annular formation around said core member, and a vane winding helically around said core member and said annular jet and having a relatively narrow active surface less than the maximum axial thickness of the vane and inclined outward at an angle to said axis and also winding around said core member in helical formation and having an inner edge spaced progressively nearer to the surface of said core member so that as the jet issuing from said throat is progressively directed outward in annular formation by said core member it travels the length of said vane and impinges on the inner edge of the active face thereof to be transformed into relatively fine spray.*

JOHN U. BETE.

REFERENCES CITED

The following references are of record in the file of this patent or the original patent:

UNITED STATES PATENTS

| Number | Name | Date |
|---|---|---|
| 1,549,537 | Hansen | Aug. 11, 1925 |
| 2,224,450 | Scofield | Dec. 10, 1940 |
| 2,359,171 | Tarbox | Sept. 26, 1944 |

FOREIGN PATENTS

| Number | Country | Date |
|---|---|---|
| 501,109 | France | Jan. 17, 1920 |